United States Patent
Shimizu et al.

[11] Patent Number: 6,071,454
[45] Date of Patent: Jun. 6, 2000

[54] METHOD FOR PRODUCING A COMPOSITE MOLDED ARTICLE OF THERMOPLASTIC RESINS

[75] Inventors: Tadashi Shimizu, Aichi; Takehiko Enomoto, Chiba; Masahiro Ito; Kenji Ogura, both of Aichi, all of Japan

[73] Assignees: Chisso Corporation, Osaka; Shimizu Industry Co., Ltd.; Denso Corporation, both of Aichi, all of Japan

[21] Appl. No.: 09/009,870

[22] Filed: Jan. 21, 1998

[30] Foreign Application Priority Data

Jan. 22, 1997 [JP] Japan ..................... 9-009623

[51] Int. Cl.[7] ............ B29C 39/12; B32B 27/08
[52] U.S. Cl. .......... 264/250; 264/255; 264/266; 264/328.7; 264/328.8; 264/331.15
[58] Field of Search .................. 264/250, 255, 264/266, 328.7, 328.8, 331.15

[56] References Cited

U.S. PATENT DOCUMENTS

| | | | |
|---|---|---|---|
| 4,385,025 | 5/1983 | Salerno et al. | 264/255 |
| 4,569,457 | 2/1986 | Hatakeyama et al. | 215/364 |
| 4,670,349 | 6/1987 | Nakagawa et al. | 428/516 |
| 4,676,386 | 6/1987 | Phlaphongphanich | 215/11 R |
| 4,803,031 | 2/1989 | Ochs et al. | 264/255 |
| 4,983,344 | 1/1991 | Brown | 264/255 |
| 5,160,474 | 11/1992 | Huff | 264/255 |
| 5,741,861 | 4/1998 | Yamamoto et al. | 525/240 |
| 5,750,268 | 5/1998 | Mace et al. | 428/475.8 |
| 5,874,139 | 2/1999 | Bosiers et al. | 428/35.2 |

FOREIGN PATENT DOCUMENTS

| | | |
|---|---|---|
| 0114479 | 8/1984 | European Pat. Off. . |
| 0529094 | 3/1993 | European Pat. Off. . |
| 61-147097 | 4/1986 | Japan . |
| 2177341 | 1/1987 | United Kingdom . |
| 9607526 | 3/1996 | WIPO . |

*Primary Examiner*—Jan H. Silbaugh
*Assistant Examiner*—Suzanne E. Mason
*Attorney, Agent, or Firm*—Leydig, Voit & Mayer

[57] ABSTRACT

A method for producing a composite molded article, includes providing a molded product of a thermoplastic elastomer; and then molding a thermoplastic rigid resin on the molded thermoplastic elastomer, to provide a composite molded article.

10 Claims, 2 Drawing Sheets

METHOD FOR PRODUCING A COMPOSITE MOLDED ARTICLE OF THERMOPLASTIC RESINS

FIELD OF THE INVENTION

The present invention relates to a method for producing a composite molded article of thermoplastic resins. More particularly, the invention relates to a method for producing a composite molded article comprising a thermoplastic elastomer and a thermoplastic rigid resin.

BACKGROUND OF THE INVENTION

Conventionally, a composite molded article of a thermoplastic elastomer and a thermoplastic rigid resin has been produced by separately preparing a molded product of an elastomer and a molded product of a thermoplastic rigid resin, and then boding them to each other by using a double-sided adhesive tape. However, the adhesion operation is troublesome.

JP-B-2-8572 (the term "JP-B" used herein means "an examined published Japanese patent application") discloses a method which does not require an adhesion operation. In the method, a propylene resin is melt-injected, and then an unvulcanized thermoplastic elastomer is melt-injected thereon to obtain a composite molded article. However, this molding process has problems in producing large molded articles due to the poor fluidity of thermoplastic elastomers, and it suffers problems such as generation of burrs or flashes at the gate during molding. Moreover, in the molding process, there are unsolved problems of warpage deformation on the polypropylene resin portion depending on the shape of the molded article, and that fusion does not occur between the polypropylene resin and the unvulcanized thermoplastic elastomer. Furthermore, in general, an unvulcanized thermoplastic elastomer (flexible material) yields a larger mold shrinkage factor as compared with a polypropylene resin (rigid material). Thus, when the unvulcanized thermoplastic elastomer is molded after molding the polypropylene resin, this difference is further increased due to the time difference. Accordingly, the deformation of the molded article and the generation of internal stress have been considered as problems to be solved. Improvement of a mold structure also must be studied to solve the problem that an undercut of the thermoplastic elastomer part cannot be formed at the joint portion between the thermoplastic rigid resin and the thermoplastic elastomer.

JP-B-6-75927 discloses a method for molding a tank made of resins. In the method, a sealing material made of a thermpolastic and elastic material is injected to form a sealing part, and then a thermoplastic resin is injected to form a thermoplastic resin part. However, further improvements are required to make the resin tank lighter and to increase the adhesion strength between the sealing material and the thermoplastic resin.

SUMMARY OF THE INVENTION

The present invention aims to solve the above described problems.

An object of the present invention is, therefore, to provide a method for producing a composite molded article comprising a thermoplastic elastomer and a thermoplastic rigid resin, which suffers less limitation in its shape, i.e., which is free from the generation of gate burrs or flashes of the thermoplastic elastomer, and which yields a less degree of warpage at the thermoplastic rigid resin part.

Other objects and effects of the present invention will become apparent from the following description.

Regarding a composite molding of a thermoplastic elastomer and a thermoplastic rigid resin, the present inventors have found that the disadvantages of the above described conventional techniques can be solved by, first, melt molding the thermoplastic elastomer and then melt molding the thermoplastic rigid resin, because of the reason that the difference in a molding shrinkage factor is reduced or almost eliminated by the time difference caused between the moldings. The present invention has been completed based on these findings.

That is, the above described objectives of the present invention have been achieved by providing a method for producing a composite molded article, which comprises the steps of:

providing a molded product of a thermoplastic elastomer; and molding a thermoplastic rigid resin to form a molded product of the thermpolastic rigid resin on the molded thermoplastic elastomer, to thereby provide a composite molded article.

In a specific embodiment, the method comprises the steps of:

positioning the molded thermoplastic elastomer at a predetermined position in a mold;

melting a thermoplastic rigid resin;

introducing the molten thermoplastic rigid resin onto the molded thermoplastic elastomer in the mold; and cooling and solidifying the introduced molten thermoplastic rigid resin to provide a composite molded article.

In another specific embodiment, the method comprises:

(a) a first molding step for providing the molded product of a thermoplastic elastomer, which comprises:

melting a thermoplastic elastomer;

introducing the molten thermoplastic elastomer into a first mold; and cooling and solidifying the introduced molten thermoplastic elastomer to provide a molded article of the thermoplastic elastomer; and (b) a second molding step for molding a thermoplastic rigid resin, which comprises:

positioning the molded thermoplastic elastomer obtained in the first molding step in a second mold;

melting a thermoplastic rigid resin;

introducing the molten thermoplastic rigid resin onto the molded thermoplastic elastomer in the second mold; and cooling and solidifying the introduced molten thermoplastic rigid resin to provide a composite molded article.

In the above specific embodiment, the first and second molds each preferably comprises a core and a cavity. Either one of the core and cavity of the first mold may be commonly used as that of the second mold. Furthermore, both the core and cavity of the first mold may be commonly used as those of the second mold. In a preferred embodiment, the melting of the thermoplastic elastomer and of the thermoplastic rigid resin are each conducted at a temperature of from 180 to 280° C.

DETAILED DESCRIPTION OF THE INVENTION

Figure 1:
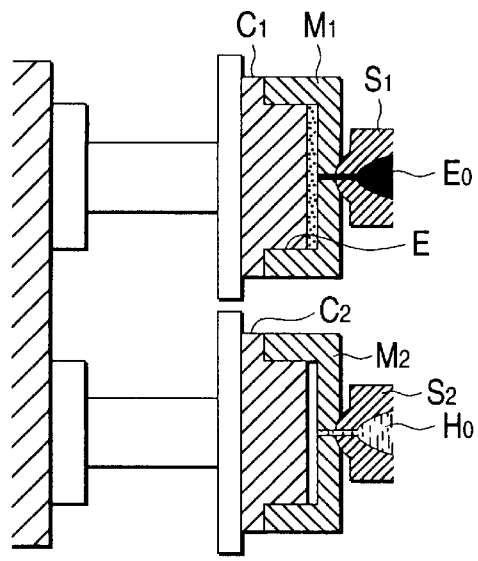
FIGS. 1(a) to 1(c) are diagrams illustrating a method for producing a composite molded article by a core back injection molding according to Example 1 of the present invention.
Figure 1:
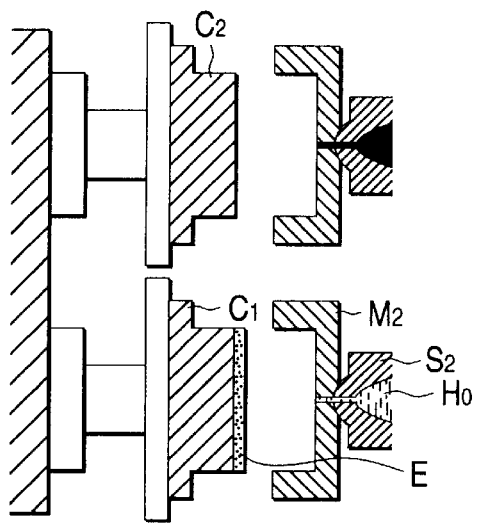
Figure 1:
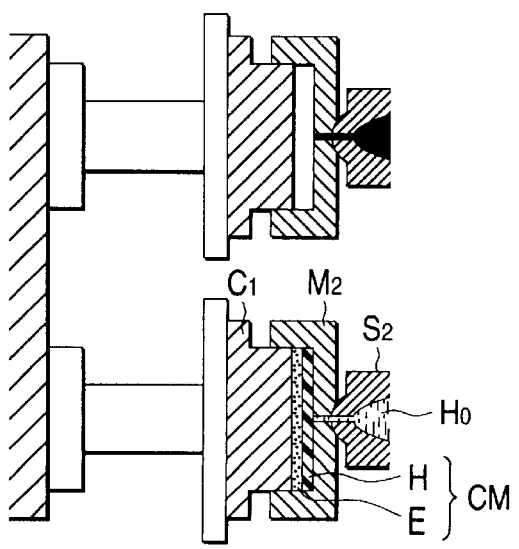

The thermoplastic rigid resin for use in the present invention can be a thermoplastic rigid resin having crystallinity. Examples thereof include polyolefin resins such as a low density polyethylene, a straight chain low density polyethylene, a high density polyethylene, a crystalline propylene homopolymer, a crystalline ethylene/propylene copolymer and polymethylpentene; acrylic/styrene/acrylonitrile copolymer, acrylonitrile/butadiene/styrene copolymers, methacrylic/styrene copolymers, nylon resins, polybutylene terephthalate resins, polyethylene terephthalate resins, polystyrene resins, styrene/acrylonitrile copolymers, polycarbonate resins. Of these, polypropylene is preferred, because the weight of the resulting thermoplastic resin composite molded article can be reduced, and because the adhesion strength can be increased. The polypropylene is preferably one having an isotactic pendant fraction of 0.94 or higher and having a crystal melting point of from 163 to 165° C., because a thermoplastic resin composite molded article of high rigidity can be obtained. The melt flow rate (measured under conditions of 230° C.:21.18N) of the polypropylene for use in the present invention is preferably from 10 g/10 minutes to 40 g/10 minutes. This is because such a polypropylene facilitate the production of a molded articles having complicated shape and a small thickness.

The thermoplastic rigid resin for use in the present invention preferably has a flexural modulus at 23° C. of 600 MPa or higher, and more preferably 800 MPa or higher. Furthermore, the thermoplastic rigid resin preferably has a melt flow rate (as measured under conditions of 230° C.:21.18N) of 5 g/10 minutes or higher. If the melt flow rate of the thermoplastic rigid resin is lower than 5 g/10 minutes, the fluidity thereof upon molding may decrease to impair the external appearance of the molded article, or to make it difficult to produce large molded articles.

The thermoplastic rigid resin for use in the present invention may contain, as needed, an inorganic filler such as talc or mica, an ethylene/propylene copolymer rubber, and a known additive including antioxidizing agents, neutralizing agents, lubricants, antistatic agents, pigments, etc., which are used in common thermoplastic rigid resins. In the present invention, the thermoplastic rigid resin composition preferably contains talc in an amount of from 5 to 20% by weight based on the weight of the composition, because a thermoplastic resin composite molded article of high rigidity can be obtained.

The thermoplastic elastomer for use in the present invention shows rubber elasticity at ordinary temperatures and can be molded in the same manner as common thermoplastic resins. The thermoplastic elastomer may be either of crosslinking type such as IPN (interpenetrated network structure) or of non-crosslinking type. Examples of the thermoplastic elastomers for use in the present invention include polyamide-based thermoplastic elastomers, polyolefin-based thermoplastic elastomers, polystyrene-based thermoplastic elastomers such as a styrene/ethylene/butylene/styrene block copolymer, a styrene/ethylene/propylene/styrene block copolymer, a styrene/isoprene/styrene copolymer, a styrene/butadiene rubber and a styrene/ethylene/propylene block copolymer, polyester-based thermoplastic elastomers, fluorine-based thermoplastic elastomers, polyisoprene-based thermoplastic elastomers and ethylene/propylene/diene elastomers. Of these, polyolefin-based thermoplastic elastomers and ethylene/propylene/diene elastomers are preferred, and ethylene/propylene copolymer elastomers are particularly preferred among the polyolefin-based thermoplastic elastomers, because a light-weight thermoplastic resin composite molded article can be obtained and a high bonding strength with the thermoplastic rigid resin can be obtained. Two or more of these thermoplastic elastomers may be used in combination.

Mineral oil may be blended with the ethylene/propylene/diene elastomers to further increase the flexibility thereof.

To further increase the rubber elasticity of the ethylene/propylene/diene elastomers, the thermoplastic elastomer may be melt kneaded while blending it with a peroxide. To further increase the bonding strength between the ethylene/propylene/diene elastomer and the thermoplastic rigid resin (e.g., polypropylene), an ethylene/propylene copolymer having a crystal melting point of from 125 to 150°C. may be blended with the elastomer.

The thermoplastic elastomer for use in the present invention preferably has a flexural modulus at 23° C. of 500 MPa or lower, and more preferably 300 MPa or lower. Further preferred are those having a melt flow rate (as measured under conditions of 230° C.:21.18N) of 0.1 g or higher. If the melt flow rate is lower than 0.1 g/10 minutes, the fluidity thereof upon molding becomes too low, and may impair the external appearance of the molded article and makes it difficult to produce large molded articles.

Crosslinking agents such as an organic peroxide, lubricants, antioxidizing agents, neutralizing agents, pigments, lubricants, mineral oil and antistatic agents, which are used in common polyolefin-based thermoplastic elastomers can be added, as needed, in the thermoplastic elastomer for use in the present invention.

The thermoplastic elastomer can be produced by an ordinary method. For example, a polyolefin-based thermoplastic elastomer can be produced according to the following method.

A crystalline ethylene/propylene copolymer and an ethylene/propylene copolymer rubber are integrally blended, and the blend is melt-kneaded by a twin-screw extruder (PCM-45, manufactured by Ikegai Tekko K.K.) which cylinder temperature is set to 200° C., to obtain a pelletized polyolefin-based thermoplastic elastomer.

Any type of molding method including, for example, thermal press molding methods and injection molding methods can be used in the molding process (including the first molding and the second molding) for producing composite molded articles according to the present invention. Examples of the injection molding method include insert-type molding and multi-color type molding, depending on the injection form, and include mold movable rotary molding, mold reciprocating molding and core back type molding, depending on the cavity form.

When the core of the first mold is also used as the core of the second mold, the positioning of the molded thermoplastic elastomer in a second mold can be omitted.

Referring to FIGS. 1(a)–(c), a representative mold movable rotary molding method (core back molding and core rotary method) is described below.

A two-color injection molding machine having a clamp force of 200 t (IS200-BV, manufactured by Toshiba Kikai K.K.) is used with setting the mold-pass water temperature, for example, to 40° C.

As a first stage molding, the temperature of the cylinder $S_1$ is set at 180° C., and a thermoplastic elastomer $E_0$ is molded by injecting it into a first stage mold comprising a core mold $C_1$ and a cavity $M_1$ at an injection pressure of 650 kg/cm$^2$ and at an injection speed of 100 mm/sec (see FIG. 1(a)).

Then, the core molds $C_1$ and $C_2$ are moved backward (to the left in FIG. 1(b)) and the core member having these two core molds is rotated to replace one core mold with the other (see FIG. 1(b)).

In this case, the second mold for use in the second stage molding is constituted by using the core $C_1$ on which the molded thermoplastic elastomer E is positioned as it is, and a cavity $M_2$ (see FIG. 1(c)).

Then, through a cylinder $S_2$, which temperature is set at 240° C., a thermoplastic rigid resin $H_0$ is injection molded into the space formed between the core $C_1$ and the cavity $M_2$ at an injection pressure of 650 kg/cm$^2$ and at an injection speed of 100 mm/sec to provide a molded thermoplastic rigid resin H on the molded thermoplastic elastomer E. Thus, a composite molded article CM is obtained.

Figure 2:
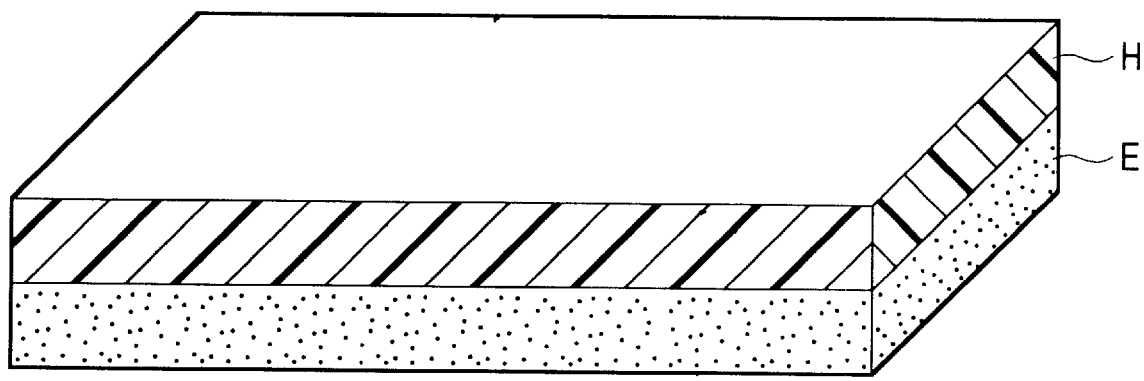
FIG. 2 is a diagram illustrating a composite molded article obtained by a production method according to the present invention, e.g., Example 1.

An example of the composite molded article according to the present invention is showed in FIG. 2. This example is a laminated sheet of a layer of a molded thermoplastic elastomer E and a layer of a thermoplastic rigid resin H. However, the composite molded article according to the present invention is not limited to such a sheet type. For example, one shown in FIG. 3 can be also obtained. This example shows a member for use in an automotive air conditioner, which member is composed of a housing component and an air-amount controlling damper.

The present invention will be described in greater detail below with reference to the following Examples, but the invention should not be construed as being limited thereto.

EXAMPLES

The molded articles obtained in the production methods in examples and comparative examples were each evaluated as follows.

Warpage of the Molded Article

A load (2 kg) was mounted on one end in the longitudinal direction of each of the composite molded articles (100 mm in width, 240 mm in length, and (2+2) mm in thickness) obtained in the examples as shown in FIG. 2, and the rise on the other end due to warpage was measured. The maximum value thus obtained was used as the warpage of the molded article.

Presence of Gate Burr

Whether gate burr (gate flash) was generated or not at the gate portion after composite molding was evaluated, and those having burr at the gate portion were marked "B", and those having no burr were marked "G".

Adhesion Test

Test pieces were produced by, first, injection molding a thermoplastic elastomer, and then injection molding a thermoplastic rigid resin. Thus, test pieces having a size of 10 (Wide)×180 (Length)×4 (Thick) mm (the thickness is composed of 2 mm of the thermoplastic elastomer and 2 mm of the thermoplastic rigid resin), but being bonded only on the central portion having an area of 10×10 mm and the rest remaining non-bonded were obtained. Then, the thermoplastic rigid resin part was stretched at one end of the test piece for a length of 400 mm at a tensile speed of 20 mm/min, and whether the bonded portion was peeled off or not was observed. For each of the Examples and comparatives Examples, five test pieces were prepared and tested as described above. When peeling of the 10×10 mm bonded portion was observed in all the five test pieces, the result was marked "B", whereas no peeling was observed in any of the five test pieces, the result was marked "VG". When peeling of the bonded portion was observed in from one to four test pieces among the five test pieces, the result was marked "G".

The thermoplastic rigid resins and thermoplastic elastomers used in the Examples and Comparative Examples are described below.

Thermoplastic Rigid Resin ($H_0$)

A composition composed of 80% by weight of a crystalline polypropylene having a crystal melting point of 164° C., an isotactic pendant fraction of 0.95, and a melt flow rate (230° C.:21.18 N) of 20 g/10 minutes, and 20% by weight of talc having an average particle diameter of 1.9 μm.

Thermoplastic Rigid Resin ($H_1$)

A composition composed of 60% by weight of a crystalline polypropylene having a crystal melting point of 164° C., an isotactic pendant fraction of 0.95, and a melt flow rate (230° C.:21.18 N) of 20 g/10 minutes, and 40% by weight of talc having an average particle diameter of 1.9 μm.

Thermoplastic Rigid Resin ($H_2$)

6-nylon having a melt flow rate (230° C.; 21.18 N) of 85 g/10 minutes and a crystal melting point of 215° C.

Thermoplastic Elastomer ($E_0$)

A blend of: 40 parts by weight of a crystalline ethylene/propylene copolymer having a melt flow rate (230° C.:21.18 N) of 6 g/10 minutes and a crystal melting point of 164° C.; 50 parts by weight of an ethylene/propylene copolymer elastomer having a Mooney viscosity of 24 $ML_{1+4}$ (100° C.) and an ethylene content of 75% by weight; 10 parts by weight of paraffin mineral oil; and 0.5 parts by weight of 1,3-bis(t-butylperoxyisopropyl)benzene was prepared, and was melt kneaded in a twin-screw extruder having a cylinder set temperature of 200° C., to obtain an elastomer having a melt flow rate (230° C.:21.18 N) of 3 g/10 minutes.

Thermoplastic Elastomer ($E_1$)

A blend of: 40 parts by weight of a crystalline ethylene/propylene copolymer having a melt flow rate (230° C.:21.18 N) of 6 g/10 minutes and a crystal melting point of 135° C.; 50 parts by weight of an ethylene/propylene/diene elastomer having a Mooney viscosity of 88 $ML_{1+4}$ (100° C.), an iodine value of 12.5, and an propylene content of 25% by weight; 10 parts by weight of paraffin mineral oil; and 0.5 parts by weight of 1,3-bis(t-butylperoxyisopropyl)benzene was prepared, and was melt kneaded in a twin-screw extruder having a cylinder set temperature of 200° C., to obtain an elastomer having a melt flow rate (230° C.:21.18 N) of 1 g/10 minutes.

Thermoplastic Elastomer ($E_2$)

Styrene/ethylene/butadiene elastomer having a melt flow rate (230° C.; 21.18 N) of 10 g/10 minutes.

Example 1

A two-color injection molding machine having a clamp force of 200 t (IS200-BV), manufactured by Toshiba Kikai K.K.) was used with setting its mold-pass water temperature to 40° C.

As the first stage molding, the temperature of the cylinder $S_1$ was set at 180° C., and the thermoplastic elastomer $E_0$ was injection molded into a first mold composed of a core mold $C_1$ and a cavity $M_1$ at an injection pressure of 650 kg/cm$^2$ and at an injection speed of 100 mm/sec. Thus was obtained a molded product E having a size of 200 mm×100 mm×2 mm (see FIG. 1(a)).

Then, the core $C_1$ that was in close contact with the molded product was moved backward and the core member having mounted thereon the core molds $C_1$ and $C_2$ was rotated (see FIG. 1(b)).

In the subsequent second stage molding, a spacing of 2 mm was provided between the core $C_1$, on which the molded article E still remains, and the cavity $M_2$. Thus, a second mold is constituted (see FIG. 1(c)).

Then, through a cylinder $S_2$, which temperature was set to 240° C., a thermoplastic rigid resin $H_0$ was injection molded into the space portion between the core $C_1$ and the cavity $M_2$ at an injection pressure of 650 kg/cm$^2$ and at an injection speed of 100 mm/sec to obtain a molded product H formed on the molded product E. Thus, a composite molded article CM having a size of 200 mm×10 mm×(2+2) mm was obtained.

The evaluation results of the molded product are shown in Table 1.

Example 2

The same procedure as in Example 1 was followed, except that thermoplastic rigid resin $H_1$ was used in place of thermoplastic resin $H_0$. The results are shown in Table 1.

Example 3

The same procedure as in Example 1 was followed, except that thermoplastic elastomer $E_1$ was used in place of thermoplastic elastomer $E_0$. The results are shown in Table 1.

Example 4

After molding a composite molded article in the same manner as in Example 2, the core $C_1$ was moved backward and the core member having cores $C_1$ and $C_2$ was rotated. The core $C_1$ having placed thereon the composite molded article as it is and the cavity $M_1$ were used as a mold for a third stage molding (the core and the cavity were the same as those of the first mold), and a 2 mm-thick space was provided between the molded article surface and the cavity $M_1$. Then, in the space, a thermoplastic elastomer was injection molded at a cylinder temperature of 180° C., an injection pressure of 650 kg/cm$^2$, an injection speed of 100 mm/sec, and a mold water pass temperature of 40° C., to obtain a three-layered composite molded article having a size of 200 mm×10 mm×(2+2+2) mm.

The results obtained are shown in Table 1.

Example 5

The same procedure as in Example 1 was followed, except that thermoplastic rigid resin $H_2$ was used in place of thermoplastic resin $H_0$. The results are shown in Table 1.

Example 6

The same procedure as in Example 1 was followed, except that thermoplastic elastomer $E_2$ was used in place of thermoplastic elastomer $E_0$. The results are shown in Table 1.

Comparative Example 1

The same molding machine as used in Example 1 was used. A thermoplastic rigid resin $H_0$ was molded as the first stage molding, and a thermoplastic elastomer $E_0$ was molded thereafter as the second stage molding.

More specifically, for the first stage molding, the temperature of the cylinder was set at 240° C., and the thermoplastic rigid resin $H_0$ was injection molded at an injection pressure of 650 kg/cm$^2$, an injection speed of 100 mm/sec and a mold pass water temperature of 40° C.

Then, the core, to which the thus obtained molded article (200 mm×100 mm×2 mm) was brought into close contact, was moved backward, and the core member having mounted thereon cores was rotated in the same manner as in Example 1.

As the second stage molding, to the 2mm-thick space formed between the cavity and the molded article surface, thermoplastic elastomer $E_0$ was injection molded at a cylinder temperature of 180° C., an injection pressure of 650 kg/cm$^2$, an injection speed of 100 mm/sec and a mold water pass temperature of 40° C., to obtain a composite molded article (200 mm×10 mm×(2+2) mm).

Comparative Example 2

The same procedure as in comparative Example 1 was followed, except that thermoplastic rigid resin $H_0$ was changed with thermoplastic rigid resin $H_1$.

The results obtained in these comparative Examples are also shown in Table 1.

TABLE 1

|  | Examples |  |  |  |  |  | Comparative Examples |  |
|---|---|---|---|---|---|---|---|---|
|  | 1 | 2 | 3 | 4 | 5 | 6 | 1 | 2 |
| First Molding |  |  |  |  |  |  |  |  |
| Thermoplastic rigid resin | — | — | — | — | — | — | $H_0$ | $H_1$ |
| Thermoplastic elastomer | $E_0$ | $E_0$ | $E_1$ | $E_0$ | $E_0$ | $E_2$ | — | — |
| Cylinder temperature (°C.) | 180 | 180 | 180 | 180 | 180 | 180 | 240 | 240 |
| Second Molding |  |  |  |  |  |  |  |  |
| Thermoplastic rigid resin | $H_0$ | $H_1$ | $H_0$ | $H_1$ | $H_2$ | $H_0$ | — | — |
| Thermoplastic elastomer | — | — | — | — | — | — | $E_0$ | $E_1$ |
| Cylinder temperature (°C.) | 240 | 240 | 240 | 240 | 240 | 240 | 180 | 180 |
| Third Molding |  |  |  |  |  |  |  |  |
| Thermoplastic rigid resin | — | — | — | — | — | — | — | — |
| Thermoplastic elastomer | — | — | — | $E_0$ | — | — | — | — |
| Cylinder temperature (°C.) | — | — | — | 180 | — | — | — | — |
| Evaluation |  |  |  |  |  |  |  |  |
| Warpage (mm) | 20 | 15 | 18 | 25 | 28 | 30 | 59 | 30 |
| Gate burr | G | G | G | G | G | G | B | B |
| Adhesion test | VG | VG | VG | VG | G | G | B | B |

As demonstrated in the results shown in Table 1, the molded articles obtained in Examples 1 to 3, which were produced by molding the thermoplastic elastomer prior to the molding of the thermoplastic rigid resin, generated no burrs at the gate portion of the cavity. However, the molded articles obtained in comparative Examples generated burrs at the gate portion and marked warpage.

Figure 3:
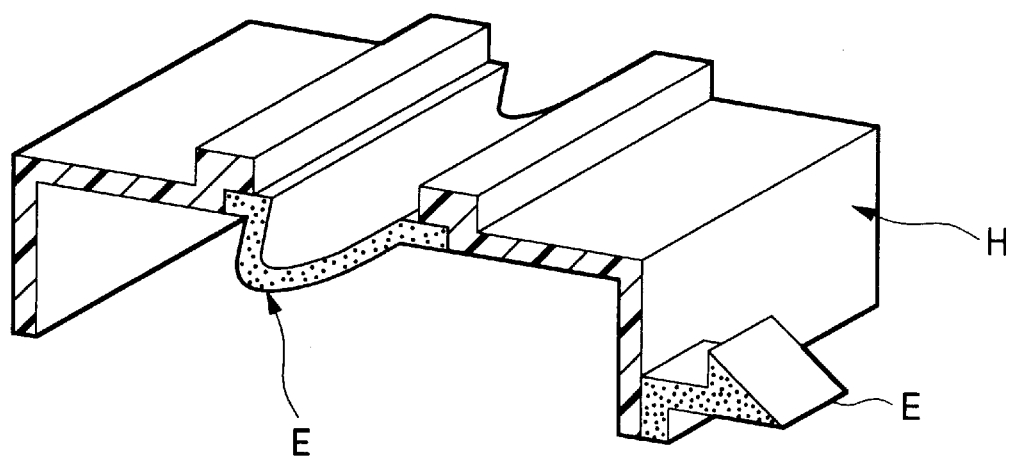
FIG. 3 is a diagram illustrating a bonded part of a housing component and an air-amount controlling damper for use in an automotive air conditioner.

The molding method according to the present invention is superior in moldability concerning various types of composite molded articles, and the molded composite articles obtained by this molding method have excellent external appearance. Accordingly, the molding method according to the present invention is particularly useful for composite molding of a thermoplastic elastomer and a thermoplastic rigid resin, such as those used in a fitting portion of an air control damper and a duct for automotive air conditioners, as well as in a bonded part of a housing component and an air control damper for automotive air conditioners, as shown in FIG. 3.

The method for producing a composite molded article of thermoplastic resins of the present invention has a feature not to generate burrs at a gate portion for injection, and to provide a molded article having reduce warpage.

While the invention has been described in detail and with reference to specific examples thereof, it will be apparent to one skilled in the art that various changes and modifications can be made therein without departing from the spirit and scope thereof.

What is claimed is:

1. A method for producing a composite molded article, the method comprising:

providing a molded thermoplastic elastomer having a melt flow rate range, at 230° C. and 21.18N of between 0.1 g/10 minutes and 10 g/10 minutes; and molding a thermoplastic rigid resin having a melt flow rate range, at 230° C. and 21.18N of between 5 g/10 minutes and 85 g/10 minutes, to form a molded thermoplastic rigid resin on said molded thermoplastic elastomer as the composite molded article.

2. The method according to claim 1, further comprising:

positioning said molded thermoplastic elastomer at a position in a mold;

melting said thermoplastic rigid resin;

introducing said thermoplastic rigid resin, while molten, onto said molded thermoplastic elastomer in said mold; and cooling and solidifying said thermoplastic rigid resin to provide the composite molded article.

3. The method according to claim 1, wherein:

providing said molded thermoplastic elastomer comprises:

melting a thermoplastic elastomer;

introducing said thermoplastic elastomer, while molten, into a first mold; and cooling and solidifying said thermoplastic elastomer to provide said molded thermoplastic elastomer; and molding a thermoplastic rigid resin comprises:

positioning said molded thermoplastic elastomer in a second mold;

melting said thermoplastic rigid resin;

introducing said thermoplastic rigid resin, while molten, onto said molded thermoplastic elastomer in said second mold; and cooling and solidifying said thermoplastic rigid resin to provide the composite molded article.

4. The method according to claim 3, wherein each of said first and second molds comprises a core and a cavity.

5. The method according to claim 4, wherein one of said core and said cavity of said first mold is commonly used as said core and said cavity of said second mold.

6. The method according to claim 4, wherein both of said core and said cavity of said first mold are commonly used as said core and said cavity of said second mold.

7. The method according to claim 3, including melting of said thermoplastic elastomer and of said thermoplastic rigid resin at a temperature from 180° C. to 280° C.

8. The method according to claim 1, wherein said thermoplastic rigid resin comprises polypropylene.

9. The method according to claim 1, wherein said thermoplastic rigid resin comprises polypropylene, and said thermoplastic elastomer comprises a polyolefin.

10. The method according to claim 1, wherein the composite molded article is a member for an air control damper, duct, or housing of an automotive air conditioner.

* * * * *